No. 746,461. PATENTED DEC. 8, 1903.
C. F. CHRISTOPHER.
SCALE.
APPLICATION FILED MAY 12, 1902.
NO MODEL.
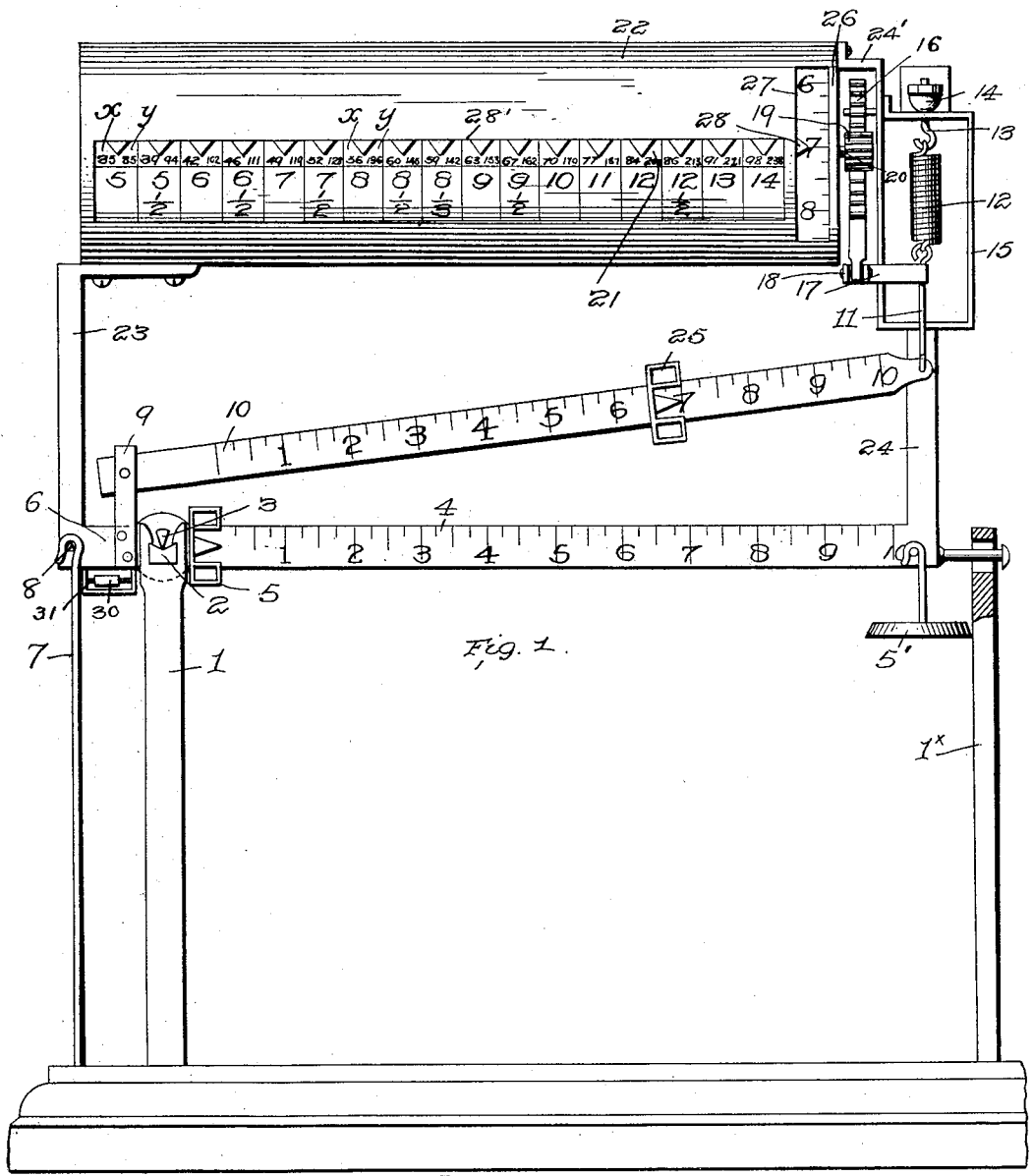

No. 746,461.                                                              Patented December 8, 1903.

UNITED STATES PATENT OFFICE.

CALVIN F. CHRISTOPHER, OF CRUSO, NORTH CAROLINA.

SCALE.

SPECIFICATION forming part of Letters Patent No. 746,461, dated December 8, 1903.

Application filed May 12, 1902. Serial No. 106,948. (No model.)

*To all whom it may concern:*

Be it known that I, CALVIN F. CHRISTOPHER, a citizen of the United States, residing at Cruso, Haywood county, North Carolina, have invented certain new and useful Improvements in Scales, of which the following is a specification.

My invention relates to the form of scales in which pivoted beams are employed with adjustable peas: It includes a main scale-beam capable of weighing heavy goods and a supplemental beam combined with the main beam and with weight and price indicating means, each beam being in a measure capable of use independent of the other beam when desired and said beams being capable of conjoint use when it is desired, for instance, to compensate for the weight of the empty receptacle in which the goods are to be placed or when it is desired to weigh amounts beyond the limit of the supplemental beam.

The computing mechanism is designed to coöperate either with the supplemental beam alone or with the two beams when used jointly, for which purpose there is provided on the chart of the computing means a set of computations for the supplemental beam and a second set of computations for the two beams when used jointly.

My invention consists in the features and combination and arrangement of parts hereinafter described, and particularly pointed out in the claims.

In the drawings, Figure 1 represents the scale in front elevation. Fig. 2 is a detail of the computing-chart.

In the drawings, 1 represents a fixed standard having a bearing-block 2, upon which rests the knife-edge bearing 3 of the main scale-beam 4. This beam is graduated and has suspended at its free end a counterpoise-hanger 5', which may be of the ordinary sectional character. This free end of the beam works in a slot or loop, as in ordinary practice, formed in or supported on a post 1$^\times$, extending up from the fixed base of the machine.

An adjustable pea 5 is arranged on this main beam, which pea performs the usual function. The main scale-beam has a short arm 6, to which a link 7 is pivotally connected at 8, said link extending down, constituting the connection to any suitable and ordinary form of movable pan or platform. (Not shown.)

An arm or bracket 9 is attached rigidly to the said short arm of the main beam, and at the upper end of this a supplemental beam 10 is pivoted, said beam extending over the main beam and normally inclining upwardly. At its free end it is connected pivotally with a rod or link 11, the upper end of which is connected with a spring 12, adjustably supported by a hook 13, held by a nut 14, supported on the frame 15. The frame is supported upon the free end of the main beam by a post 24, rigidly connected to or formed with the main beam. A rack-bar 16 is connected to the rod 11 by a laterally-extending arm 17, having a fork at 18, in which the lower end of the rack is pivoted. The rack-bar meshes with a pinion 19 on the shaft 20 of a weight indicating and computing drum or chart 21, contained within a casing 22. This casing is supported by a post 23, extending up from the short arm of the scale-beam, and by an arm 24', extending from the frame 15, the said frame 15 being in turn supported, as before stated, on the main scale-beam by an arm or post extending up from the free end thereof.

On the supplemental scale-beam 10 an adjustable pea 25 is arranged.

From the construction described it will be noticed that all parts of the computing-scale, including the supplemental beam, the chart, the casing, and the frame, are supported upon the main scale-beam and move therewith as one body.

The main scale, which includes the main scale-beam with its counterpoise-hanger and adjustable pea and the connection to the movable platform, can be used as ordinarily. For this purpose the pea of the computing or supplemental scale-beam is adjusted to zero. By placing the sections of the counterpoise-hanger in position on the suspended support 4 and then adjusting the pea 5 along the main scale-beam the usual weighing operation may be performed in the usual manner, and this may be done entirely independent of any operation of the computing mechanism.

In all the movements of the scale-beam the whole upper structure moves as one body.

Now if it is desired to weigh out a certain amount of goods to be placed in a bucket or other receptacle the weight of which is not known both portions of the scale are brought into use in the following manner: The receptacle to receive the goods is first placed on the platform, and by means of the adjustable pea 5 on the main scale-beam the beam is balanced. The adjustable pea on the supplemental beam is now adjusted to the mark indicating the weight of goods desired. This of course throws the main beam out of balance. The goods are now placed in the receptacle, and when the main scale-beam reaches its balanced position again the proper weight of goods has been obtained. In this use of the scale the pea on the main beam acts as a tare-weight for the supplemental beam.

In the use of the scale as a computing or price scale the supplemental scale-beam, with its pea, is used for obtaining the balance of the parts. By shifting the adjustable pea 25 along this beam, which, as shown, is graduated, the goods may be weighed just as though the main beam were used, the whole upper structure turning about the knife-edge pivots of the main beam until a balanced position of the said main beam is reached indicating that the proper weight of material on the movable platform or pan has been obtained. In this action the supplemental beam will have performed a movement about its own pivot in addition to that which it performs jointly with the main scale-beam about the pivot of the latter. In other words, the supplemental scale-beam will have moved about its pivot nearer to the main beam due to the adjustment mentioned of the pea 25 along the supplemental scale-beam, and consequently the connections leading to the computing cylinder or chart will be drawn upon, thus turning the chart within its casing to bring the proper computation to view opposite the unit price-mark on the casing.

At the end 26 of the cylinder the weight-graduations are placed, these appearing through an opening 27 in the cylinder and an index 28 being used on the casing to indicate the weight.

The price-marks per pound or the like appear on the casing along the edge of an opening or slot 28', while the computations appear on the cylinder and show through the said slot. These computations appear in red and black, there being a red and black series for each price-mark. Of these series those marked $x$ in black are intended for use exclusively with the supplemental scale-beam—that is, when the weighing operation is performed simply by adjusting the pea 25 to the desired position on its beam. The number of pounds which can be weighed on the supplemental scale-beam are necessarily somewhat limited, and in order to weigh and compute beyond the limit represented by the graduations on this supplemental beam I employ the main beam jointly with the supplemental beam and use the other or red series of computations (marked $y'$) when the two beams are used in conjunction. For instance, supposing it is desired to weigh and compute the price of ten pounds of sugar at five cents per pound, the pea on the main beam will be adjusted to zero and the pea 25 on the supplemental or computing beam is adjusted to "10," and the goods having been placed on the platform until the main beam is balanced the computing-cylinder will indicate the price to be "50," and at the same time the weight will be indicated on the computing-cylinder by the index or pointer.

Supposing, further, it is desired to weigh and compute the price for eleven pounds of sugar—that is beyond the limit of the supplemental beam—the pea on the main beam is adjusted to correspond with the highest graduations on the supplemental beam and the pea on the supplemental beam is adjusted to make up the difference between what can now be weighed on the main beam and the weight desired, and then by reading from the second set of computations, or those appearing in red, the desired price is obtained.

If, for instance, it is desired to weigh eleven pounds at five cents per pound, the pea on the main beam would be adjusted to "10" and that on the supplemental beam would be set at "1" and the reading would be made from the red price-mark on the chart. These price-marks are arranged consecutively about the cylinder. For instance, if the row or circle of black marks runs from "5" to "220" the mark "225" would appear in red as a companion to the black mark "5," and the red marks would then follow in regular order—"230," "235," &c.—and running in the same direction about the chart as the set first mentioned. By this arrangement a chart of small diameter can be employed for a wide range of weights and prices.

In order to keep the scale in balance, I employ a small adjustable weight at 30, supported on a screw-threaded rod 31, carried on a frame attached to the short arm of the main scale-beam. By turning this weight it may be adjusted to different positions along the rod, and thus nearer to or farther from the pivot of the main beam.

It will be noticed that the computing-chart is in the form of a cylinder with its axis extending horizontally and with its price-marks extending circumferentially. The unit price-marks are arranged in a horizontal row, and by this arrangement the reading of all the scale-beam graduations, the price-per-unit marks, and the computations can be readily and quickly performed, as all of them appear substantially in horizontal rows.

I claim—

1. In combination, a main scale-beam with its pea, a platform connection therefrom and computing means comprising a supplemental beam with its pea independent of the pea on the main beam, a computing-chart connected with and operated by the supplemental beam, and means for returning the supplemental beam to normal position, said supplemental beam having movement independent of that of the main beam, substantially as described.

2. In combination, a main scale-beam, a platform connection therefrom, a freely-movable supplemental beam pivotally connected to the main beam to move toward and from the said main beam and extending over the same, adjustable peas on the beams and computing means connected to the supplemental beam to be operated by the movement thereof, substantially as described.

3. In combination, a main scale-beam, a platform connection therefrom, a freely-movable supplemental beam pivotally connected to the main beam and extending over the same, independently-adjustable peas on the beams and computing means connected to the supplemental beam to be operated thereby, said computing means comprising a chart, a casing and operating connections all carried by the main beam, substantially as described.

4. In combination, a main beam, a supplemental beam pivotally carried thereby, a computing-chart connected with the supplemental beam and carrying a set of computations for the supplemental beam and another set of computations for the two beams when used jointly, platform connections and a spring connected with the supplemental beam, substantially as described.

5. In combination, a main beam with its pea, a supplemental beam pivoted to the main beam and having an adjustable pea, price-indicating means comprising a computing-chart with its casing supported on the main scale-beam and having two sets of computations, one for the supplemental beam alone and the other for both beams when used conjointly, a connection for operating the price-indicating mechanism from the supplemental beam, a spring connected with the supplemental beam, and a platform connection to the main beam, substantially as described.

In testimony whereof I affix my signature in presence of two witnesses.

CALVIN F. CHRISTOPHER.

Witnesses:
 HENRY E. COOPER,
 C. S. MIDDLETON.